United States Patent Office

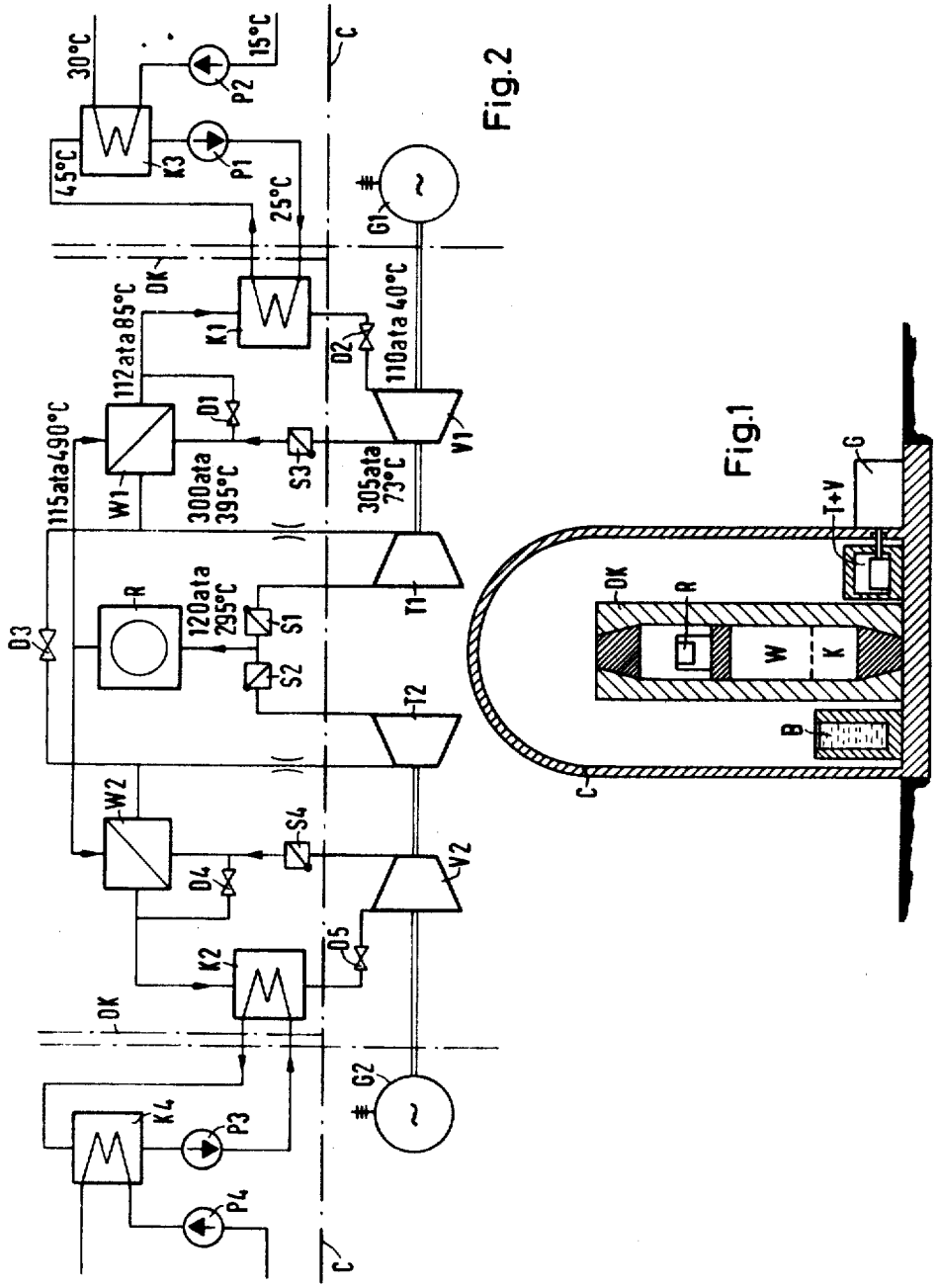

3,444,038
Patented May 13, 1969

3,444,038
NUCLEAR POWER STATION WITH CARBON DIOXIDE COOLING SYSTEM
Hans-Peter Schabert, Erlangen, Germany, assignor to Siemens Aktiengesellschaft, a corporation of Germany
Filed July 7, 1967, Ser. No. 651,876
Claims priority, application Germany, July 9, 1966, S 104,720
Int. Cl. G21d 1/04
U.S. Cl. 176—60                                   15 Claims

ABSTRACT OF THE DISCLOSURE

Nuclear power station with carbon dioxide cooling system for producing electrical energy includes at least one gas turbine connected to a compressor and disposed upstream of the coolant gas inlet to the reactor, a regenerative heat exchanger connected in the coolant gas line between the compressor and the gas turbine, the primary loop of the regenerative heat exchanger being traversed by heated coolant issuing from the reactor either directly or after being relatively slightly reduced in pressure, the coolant further traversing a cooler connected in the primary loop, the coolant entering the compressor having a pressure within a range of at least 40 atmospheres absolute and 130 atmospheres absolute.

---

My invention relates to nuclear power station having a carbon dioxide cooling system for mainly producing electrical energy with the aid of one or more gas turbines.

The use of gas turbines for driving electrical generators so as to convert primary heat produced in nuclear power systems is known per se. To achieve the most favorable efficiency it has been heretofore proposed that the coolant gas temperature be maintained as high as possible and the gas, after issuing from the reactor, be greatly expanded or pressure-relieved. However, this is accompanied by serious problems with regard to the stability or durability of the materials employed and to the corrosion resistance thereof which are solvable only at relatively high cost. Moreover, the coolant gas circuit or loop outside the reactor proper then tends to become very complex and voluminous in these known systems because, as a general rule, several compressors and coolers are provided in serial arrangement in the outside loop portion. This cost is readily comparable, however, with the cost of conventional nuclear power stations that are water and steam-cooled, so that at best only modest benefits are obtained by a particular choice of a nuclear power station, namely minimal cost of the electrical kilowatt hours that are produced. Of further disadvantage are the ordinarily large conduit cross sections of the known systems which allow coolant to escape very rapidly in the event of a conduit break, so that there is very great danger of the destruction of the fuel elements due to overheating. In addition, in the heretofore known systems, relatively high compressor power expenditure must be reckoned with.

It is accordingly an object of my invention to provide nuclear power station with carbon dioxide cooling system which avoids the aforementioned disadvantages of the heretofore known systems of this general type. It is more specifically an object of my invention to provide a nuclear power station with a gas turbine connected thereto, that is marked by its great simplicity and its consequent slight susceptibility to breakdown and, in spite, of a possible slightly lower efficiency as compared to conventional systems, nevertheless produces electrical kilowatt hours at a considerably lower cost than the conventional systems. In this regard, it is a specific object of my invention, to employ the especially favorable properties of carbon dioxide as coolant gas at special pressure conditions and at relatively low temperature thereof so that the aforementioned stability and corosion problems affecting the materials employed no longer play any significant role.

With the foregoing and other objects in view, I provide in accordance with my invention, nuclear power station with carbon dioxide cooling system for producing electrical energy comprising at least one gas turbine connected to a compressor and disposed upstream of the coolant gas inlet to the reactor, a regenerative heat exchanger connected in the coolant gas line between the compressor and the gas turbine, the primary loop of the regenerative heat exchanger being traversed by heated coolant emerging from the reactor either directly or after being relatively slightly reduced in pressure, the coolant further traversing a cooler connected in the primary loop, the coolant entering the compressor having a pressure within a range of at least 40 atmospheres absolute and 130 atmospheres absolute. Within this range of induction pressures, a relatively high density of the coolant medium is produced in the compressor, and the compressor power requirement therefore becomes very small, so that as a rule an intermediate cooler can be dispensed with.

In accordance with a further feature of my invention, I provide nuclear power station wherein the reactor proper, the cooler and the regenerative heat exchanger are disposed in an integrated construction within a pressure vessel preferably formed of prestressed concrete. Since the reactor, cooler and regenerative heat exchanger, respectively, contain the coolant at only relatively slight differences of pressure, by means of such construction the opportunity is presented for effecting greater simplifications in both the erection and operation of the power station.

In accordance with a further feature of my invention, I provide nuclear power station of the aforementioned type wherein only the gas turbine or turbines and the compressor or compressors are located outside the reactor pressure vessel so that the wall of the pressure vessel is broken only by a relatively limited number of compressed gas conduits of small nominal width or diameter. This is of especially great importance from the standpoint of safety engineering because, in the event of a leak occurring in one of these conduits, an automatic and rapid sealing thereof can be ensured and a predetermined quantity of the escaping coolant gas will therefore not be exceeded. Naturally, the aforementioned components of the power station of my invention, which are conventional and necessary for nuclear power stations, are located within a reactor containment vessel or structure, that is capable of containing the coolant and accompanying radioactive materials which may be released even by a very great catastrophic occurrence, and is capable of insuring the smallest possible density of the coolant necessary for after-cooling the reactor core. The generators for producing electric current and the excitation machines cooperating therewith can be located outside the containment structure. The Pony motors or engines necessary for starting up the turbines can be installed either inside or outside the containment structure. It is accordingly also possible to combine Pony motors and excitation machines in a mechanical unit so that simplifications with respect to construction and mounting of the current-producing assemblies result therefrom.

For purposes of safety engineering, it is expedient to connect a nuclear reactor with several gas turbines having separate circulartory loops or paths instead of only one. In the event one of the turbines breaks down, the required cooling of the reactor can accordingly be maintained quite readily, and it is also possible in this way to vary the energy drawn from the reactor while maintaining relatively good efficiency within broad limits.

Other features which are considered as characteristic for the invention are set forth in the appended claims.

Although the invention is illustrated and described herein as nuclear power station having a carbon dioxide cooling system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal section through the nuclear power station of my invention showing schematically the assembly of necessary components thereof;

FIG. 2 is a circuit diagram of the nuclear power station of my invention;

Figure 3:
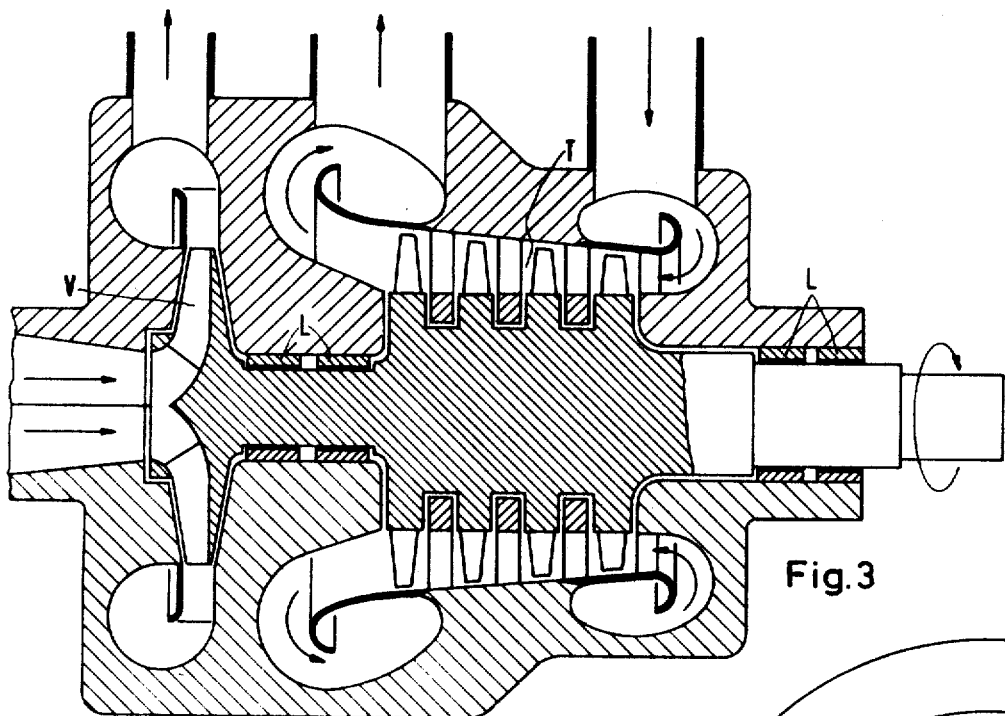
FIG. 3 is a longitudinal sectional view of an integrated turbine and compressor construction in accordance with my invention.

Referring now to the drawing and first particularly to FIG. 1 thereof, there is shown a reactor safety structure or containment vessel C, in the interior of which there is disposed a pressure vessel DK. Within the pressure vessel DK there is located a nuclear reactor R, a heat exchanger W and a cooler K which can consist of several units, depending upon the number of connected turbines T located within the safety structure C but nevertheless outside of the pressure vessel DK, as shown. A compressor V is assembled together with the turbine T. The shaft of the turbine extends through the wall of the containment structure C and is coupled to a generator G located outside the containment structure. It is obviously within the scope of my invention to provide the coupling between the turbine and the generator inside the containment vessel C or an intermediate shaft with two couplings or clutches can suitably be provided so that one of the clutches or couplings can be located within the containment vessel C and the other thereof can be located outside the containment vessel C. In each case, however, a seal is provided at the location of the containment vessel wall through which the shaft between the turbine and the generator extends. The seal may be of the type known from pump and blower technology or the type conventionally known also from hydrogen-cooled electrical generators, such as an oil seal with a floating ring. In this special case, it is even possible to connect the bearing plate of the generator G rigidly and tightly with the outer wall of the containment structure C so that the seal provided in the bearing plate of the generator G also, serves simultaneously as the seal for the opening in the wall of the containment structure C through which the shaft extends. At the high power outputs of the generators under discussion, which are in the order of magnitude of several hundred megawatts, these generators are conventionally provided with a hydrogen cooling system, for example. In the schematic view of FIG. 1, the generator G also includes the excitation machine as well as the Pony motor cooperating therewith, and which are necessary for starting up the turbine. As mentioned hereinabove, it is therefore expedient to combine the excitation machine and the Pony motor in a closed and integrated machine unit.

Within the safety structure or containment vessel C, there are, obviously, also located other components such as, for example, the illustrated fuel element decay receptacle or spent fuel pit B as well as crane installations (not shown). The latter are not illustrated in the interest of maintaining the clarity of the drawing and particularly because they are of no significance with regard to the invention of the instant application.

In the circuit diagram of FIG. 2, there are shown two turbines T1 and T2. Hereinafter, only the equipment related to turbine T1 is described in detail but it will be understood that similar equipment is associated with the turbine T2. Additional gas turbines can also be connected in an analogous manner to the nuclear reactor R. The specific construction of the nuclear reactor proper is not described herein since reactors of many known types of construction can be employed for the system of energy conversion in accordance with my invention, and are consequently of no special significance with regard to the invention. It should be only noted, however, that preferably reactors moderated with heavy water or fast breeders are involved as heat sources because it is possible with generators of these types to achieve coolant gas temperatures in the order of magnitude of 500° C. at pressures in the order of magnitude of 100 to 150 atmospheres.

More particularly, FIG. 2 shows the circulatory loop of the gaseous coolant carbon dioxide and its essential component elements for transforming the heat energy obtained from the reactor R into electrical energy. The coolant gas flow from the reactor R divides, in the embodiment of the system illustrated in FIG. 2, into two similar branches, of which each can be considered by itself. For a better comprehension of the operation of the system, the respective pressure and temperature data of the coolant at various locations in the system are shown in FIG. 2. Thus the heated coolant initially flows out of the reactor with a temperature of 490° C. and pressure of 115 atmospheres absolute (ata.). The volume of the coolant at this point of the system per kilogram thereof is 12.5 liters (l.). The coolant then flows into the regenerative heat exchanger W1 and is cooled there, without any preceding expansion, to about 85° C. The pressure of the collant is then about 112 ata. and its volume per kilogram 4.1 liters. With this greatly increased density, the coolant gas is thereafter cooled in the cooler K1 to 40° C. and attains a pressure of substantially 110 ata. Its volume per kilogram is then reduced to 1.5 liters. In the connected compressor V1, whose rotor is, for example, disposed with the rotor of the turbine T1 together on a common shaft, as shown diagrammatically in FIG. 2, the pressure of the coolant is increased without intermediate cooling to 305 ata., the temperature also increasing to substantially 73° C. At this point of the system, the volume of the coolant per kilogram is 1.3 liters. The coolant having this relatively high density then passes into the regenerative heat exchanger W1 and is heated therein by the hot coolant issuing from the reactor to approximately 395° C. Furthermore, before the coolant then flows into the turbine T1, its pressure is slightly reduced to about 300 ata., but the volume of the coolant per kilogram is increased to 4.2 liters. The coolant expands in the turbine T1, as it drives the turbine T1, to substantially 120 ata. and returns with a temperature of about 295° C. and a density of 8.5 liters per kilogram to the reactor. By the aforedescribed and illustrated circuit or interconnection of components in the system of my invention, the coolant flows at very high density to the compressor V1 so that the power requirement of the compressor V1 is relatively small (about 40% of the generator power). Also, from the standpoint of space requirements, the unit construction of the turbine T1 and the compressor V1 is very small, because both the turbine and compressor, in the case of a rotary speed of 3,000 revolutions per minute have only about 5 to 10 stages for a diameter of only about 1.3 meters. This machine unit or generator set should, therefore, also be clearly smaller than the conventional structural assembly of blower, Pony motor and steam turbine for driving the blower, employed with gas-cooled nuclear power stations operating on a steam process principle, and it must be noted, that the invention does not only relate to the driving turbine for the compressor or the blower but also to the power turbine for the generator G1. It is also expedient to provide this apparatus with high pressure shaft seals such as are used and proposed for example for blowers in reactor technology.

As aforementioned, the turbine T1 and the compressor V1 are located outside of the reactor pressure vessel DK. The boundary limits of this reactor pressure vessel DK is shown in FIG. 2 by a dot-dash line. It can thus be noted from FIG. 2 that each gas turbine unit is connected altogether only by four conduit leads to the reactor vessel DK. Due to the high density of the coolant medium, these conduit leads are relatively small, particularly those conduit leads connected to the compressor which practically convey quasi-liquid carbon dioxide gas. In the case of a break in the conduit leads outside the reactor pressure vessel DK, the quantity of coolant escaping can be further limited by installing check members or valves or pipe-burst valves in the interior of the pressure vessel. Also, nozzle-like constrictions wherein the event of an accident, sonic velocity is attained, are suitable for limiting the escape of coolant.

The conduit leads are, properly speaking, only of short length. If the conduits are heat-insulated by conventional means on the inner surface thereof and, under certain conditions, are cooled on the outer surface thereof in addition, this being possible without any particular difficulties due to the short length thereof, then bends and bellows to compensate for thermal expansion, which are in fact undesirable in flow technology, can be dispensed with from the very start.

For regulating the entire installation or system, it is expedient to connect a greater or lesser number of gas turbines in the system, and to effect for start-up as well as for intermediate load ranges, by-pass regulation through the throttle valve D1 or throttling through the valve D2 in the suction conduit leading to the compressor V1. The power supplied by the power station can also be reduced by reducing the pressure in the reactor. In such a case or when an undesired reduction in pressure occurs due to a leak, the density of the quasi-liquid coolant is reduced more rapidly in the compressor V1 than in the turbine T1. The compressor must, therefore, deliver a considerably increased throughput volume for a given rotary speed. It is expedient for this reason to furnish the compressor with conventional radial impellers because they will accommodate themselves particularly easily to changes in the throughput. With such an installation, changes in the load can be very rapidly responded to, because the gas turbines are very small and are driven at only about 395° C. inlet temperature, and particularly the reactor, when it is a fast reactor, does not impose any restrictions, since contaminating phenomena due to Xenon, remain negligible.

The cooler K1 can be operated with river or tap water or can be directly connected to a cooling tower. It is expedient however for reasons of safety and resistance against corrosion that an intermediate circulating loop be traversed by de-gassed purified water, which, as shown in FIG. 2, passes through a heat exchanger K3 and a pump P1 located outside the reactor containment structure C. The secondary loop of the heat exchanger K3 is provided with river or tap water or is connected to a cooling tower. The inlet temperatures of the intermediate coolant in the heat exchanger K1, in the example illustrated in FIG. 2, is 25° C. and in the heat exchanger K3 is 45° C. The coolant supplied in the secondary loop by the pump P2 has an inlet temperature of about 15° C. and an outlet temperature of about 30° C.

The quantity of the coolant in the secondary loop is relatively small because the coolant in the primary loop need only be cooled down to substantially 40° C. in the heat exchanger K1. For reasons of expediency, these heat exchanging apparatuses operate on the counter-flow principle.

When two turbine units are employed with one reactor it is advisable to provide a conduit lead between the secondary side of the respective heat exchangers W1 and W2, for example, in which a controllable valve D3 is installed. It is thereby possible to once again start up a temporarily stopped turbine unit without requiring renewed operation of the Pony motor. To insure that the coolant will flow in the same direction for every operating condition of the nuclear power station, a number of check valves S1, S2, S3 and S4 are moreover provided which, otherwise similar to the aforementioned non-illustrated pipe-break valves and throughput-limiting nozzles, serve for reducing coolant losses in in the event of a break in the conduits of the system. When several turbine units are employed with the system it is advisable to provide a start-up circular conduit lead having a respective valve for each turbine unit.

Due to its simplicity of construction, the power station of my invention is marked especially by its extremely limited susceptibility to breakdown or disturbance. Production costs are therefore relatively small. Also, if the efficiency (which is about 30% for the described system) is somewhat smaller with respect to comparable conventional gas turbine installations, it nevertheless provides, in the final analysis, a considerably lower cost per kilowatt hour of the energy produced, a factor which is of primary significance for the profitability of a power station installation.

With respect to the embodiment shown in the figures, the efficiency can be increased somewhat when the coolant, before its admission into the regenerative heat exchanger W1, is conducted through a further small gas turbine which, however, would have only a slight pressure drop to a maximum of 30% of the reactor pressure. Such an added turbine would result, on the other hand, in a by-no-means inconsiderable complication of the entire installation, requiring additional conduit leads, and resulting in greater differential pressures in the pressure vessel, and therewith part of the advantage with respect to installations in the present state of the art, which operate with a large expansion of the gas after its discharge from the reactor, would be lost. The advantage afforded by the small dimensions of the turbine, heat exchangers and conduit leads would nevertheless, however, remain in part. The integral construction of most of the installation components not only has the advantage of the afore-described slow pressure release or expansion after a leak is formed and of the relatively small cross section of the conduit tubes, but also the advantage of permitting the presence of very small leaks because the interior of the pressure vessel is at the pressure of the system and no other gaseous material is present except the coolant gas carbon dioxide. The advantages stemming from an installation of this type are also attractive, however, if for any reason it is deemed necessary to refrain from employing an integrated construction.

In FIG. 3 there are shown a gas turbine T and a compressor V in an integral or compact machine structure, the turbine and compressor being mounted by two sets of bearings L on a common shaft. In the embodiment of FIG. 3 it is clearly shown that the compressor V is furnished with a radial impeller.

Figure 4:
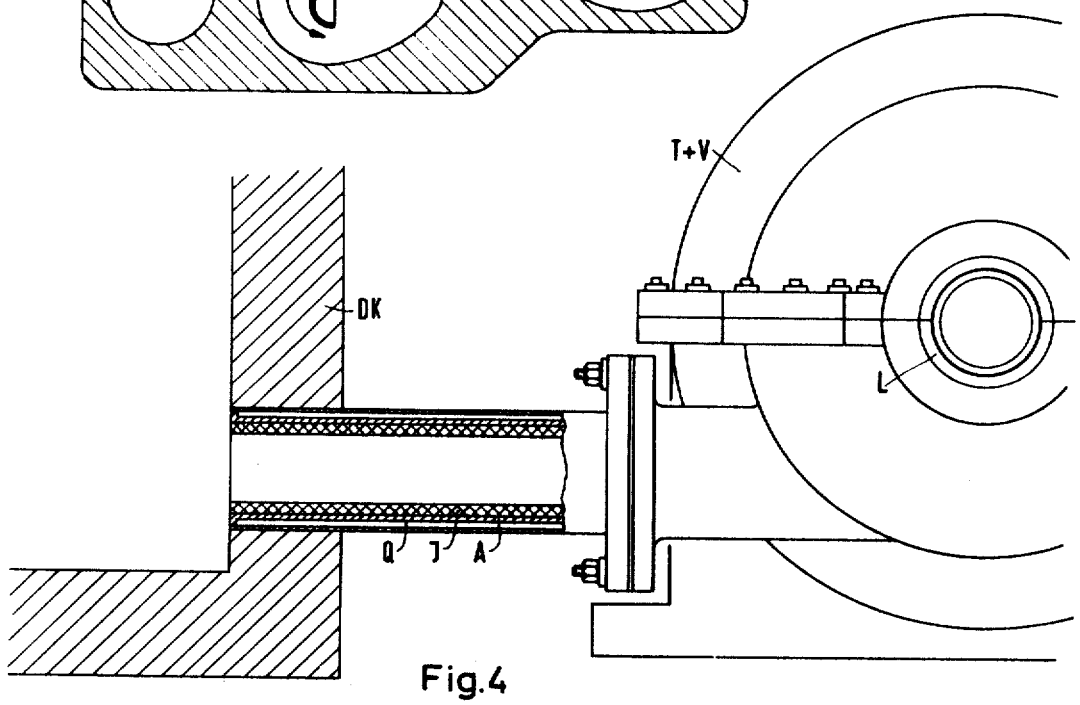
FIG. 4 is an elevational view partly in section and partly fragmentary showing the connection between the turbine and the reactor pressure vessel.

FIG. 4 shows how a carbon dioxide conduit lead A extends through the wall of the reactor pressure vessel DK. The conduit lead A can consist of steel, for example, which has a wall thickness of about 30 mm. In the interior thereof it is clad by a known type of construction with a heat insulating layer J, the thickness of the layer J being about 100 mm. The remaining flow cross section through the conduit lead A has a diameter of about 800 mm. At its outer surface, the conduit A is provided with a cooling jacket Q which is traversed by a coolant such as water, oil, or also gas at adjustable temperature, for example. The coolant circulatory loop is not otherwise illustrated for the sake of clarity. Also shown in FIG. 4 is the unitary structure of the turbine T and compressor V of FIG. 3.

Although in the specific embodiment of my nuclear power station cooling system described herein and shown diagrammatically in FIG. 2, the coolant enters the compressor with a pressure of 110 ata., it is within the scope of my invention to provide coolant at the location which has a pressure ranging from at least 40 ata. to 130 ata., and preferably ranging from 70 to 130 ata.

I claim:

1. Carbon dioxide cooling system for a nuclear power station producing electrical energy comprising a primary coolant loop including at least one gas turbine and a compressor connected thereto, both said turbine and said compressor being located upstream of a coolant gas inlet to the nuclear reactor of the power station, a regenerative heat exchanger having a first coolant flow path connected in said primary coolant lop between the outlet of said compressor and said turbine and a second flow path connected to a coolant gas outlet of the nuclear reactor, a cooler connected in said primary loop between the second flow path of said regenerative heat exchanger and the inlet of said compressor and carbon dioxide coolant gas traversing said primary loop and having a pressure at the inlet to said compressor relatively slightly less than the pressure thereof at the coolant gas outlet of the nuclear reactor and within a range of at least 40 to 130 atmospheres absolute.

2. Cooling system according to claim 1, wherein said reactor, said cooler and said regenerative heat exchanger are disposed in integrated construction within a pressure vessel.

3. Cooling system according to claim 2, wherein said pressure vessel is formed of prestressed concrete.

4. Cooling system according to claim 1, including a pressure vessel wherein said reactor, said cooler and said regenerative heat exchanger are disposed, and a containment structure surrounding and spaced from said pressure vessel, said gas turbine and said compressor being located outside said pressure vessel but within said containment structure.

5. Cooling system according to claim 4, wherein the power station includes at least one electrical generator and an excitation machine and Pony motor associated therewith, said generator, excitation machine and Pony motor being located outside said containment structure.

6. Cooling system according to claim 4, wherein said gas turbine and said compressor are combined as one compact machine and have respective rotors disposed on a common rotary shaft, said shaft sealingly extending through an opening in the wall of said containment structure with an electrical generator located outside said containment structure.

7. Cooling system according to claim 6, wherein said shaft is supported on only two sets of bearings.

8. Cooling system according to claim 1, wherein said compressor has a radial-flow impeller.

9. Cooling system according to claim 1, including a pressure vessel wherein said reactor, said cooler and said regenerative heat exchanger are disposed, a containment structure surrounding and spaced from said pressure vessel, said gas turbine and said compressor being located outside said pressure vessel but within said containment structure, and conduit means between components of said primary loop within said pressure vessel and outside said pressure vessel, said conduit means being heat-insulated in the interior surface thereof.

10. Cooling system according to claim 9, including means at the outer surface of said conduit means for additionally cooling the coolant in said conduit means.

11. Cooling system according to claim 1, including check valve means and throttling means located in said primary loop for limiting coolant loss resulting from a break in the loop.

12. Cooling system according to claim 1, including a plurality of gas turbines connectible in said primary loop, and means for varying the number of said gas turbines connected into said loop whereby the necessary cooling can be ensured and improved accommodation to load can be effected.

13. Cooling system according to claim 1, wherein said nuclear reactor is heavy-water moderated.

14. Cooling system according to claim 1, wherein said nuclear reactor is a fast breeder reactor.

15. Carbon dioxide cooling system for a nuclear power station producing electrical energy comprising a primary coolant loop traversed by carbon dioxide coolant, said primary loop including heat exchanger means for transferring heat generated by a nuclear reactor to said coolant, regenerative heat exchanger means having a flow path traversible by said coolant downstream from the reactor at a pressure of substantially 115 ata. and a temperature substantially of 490° C. and adapted to reduce the temperature thereof to substantially 85° C. while the pressure thereof is relatively slightly reduced, means downstream of said regenerative heat exchanger means for further cooling said coolant to substantially 40° C. while the pressure thereof is relatively slightly further reduced, compressor means downstream of said cooling means for increasing the pressure of said coolant to about 300 ata. and the temperature thereof to about 70° C., said regenerative heat exchanger means having another flow path connected downstream from said compressor and being adapted to receive said coolant and increase the temperature thereof to about 400° C., turbine means downstream of the first flow path of said regenerative heat exchanger means for reducing the pressure of said coolant to substantially 120 ata. and the temperature thereof to about 300° C., and means for returning said coolant to said first-mentioned heat exchanger means.

References Cited

UNITED STATES PATENTS

| 2,882,687 | 4/1959 | Stivender | 60—59 |
|---|---|---|---|
| 3,065,162 | 11/1962 | Hub | 176—60 X |
| 3,201,941 | 8/1965 | La Fleur | 60—59 |
| 3,205,140 | 9/1965 | Coudray et al. | 176—60 X |
| 3,210,254 | 10/1965 | Fortescue | 60—59 |
| 3,296,082 | 1/1967 | Lemesle et al. | 176—60 X |
| 3,324,652 | 6/1967 | Maillet | 60—59 |

REUBEN EPSTEIN, *Primary Examiner.*

U.S. Cl. X.R.

60—59; 176—65, 87